United States Patent
Bali et al.

(10) Patent No.: US 9,160,792 B2
(45) Date of Patent: Oct. 13, 2015

(54) ON-DEMAND GLOBAL SERVER LOAD BALANCING SYSTEM AND METHOD OF USE

(75) Inventors: Bahri B. Bali, Danbury, CT (US); Gordan G. Greenlee, Endicott, NY (US); Richard E. Weingarten, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 2170 days.

(21) Appl. No.: 11/098,854

(22) Filed: Apr. 5, 2005

(65) Prior Publication Data

US 2006/0224725 A1    Oct. 5, 2006

(51) Int. Cl.
*G06F 15/173* (2006.01)
*H04L 29/08* (2006.01)
*H04L 29/12* (2006.01)

(52) U.S. Cl.
CPC ........ *H04L 67/1008* (2013.01); *H04L 67/1002* (2013.01); *H04L 67/1021* (2013.01); *H04L 67/1029* (2013.01); *H04L 29/12066* (2013.01); *H04L 61/1511* (2013.01)

(58) Field of Classification Search
CPC . H04L 45/00; H04L 67/1004; H04L 67/1008; H04L 67/1029
USPC .................. 709/223, 224, 226, 232
See application file for complete search history.

(56) References Cited

U.S. PATENT DOCUMENTS

| | | | |
|---|---|---|---|
| 5,325,292 A | 6/1994 | Crockett | |
| 5,467,268 A | 11/1995 | Sisley et al. | |
| 5,471,382 A | 11/1995 | Tallman et al. | |
| 5,473,773 A | 12/1995 | Aman et al. | |
| 5,918,017 A * | 6/1999 | Attanasio et al. | 709/224 |
| 6,003,083 A | 12/1999 | Davies et al. | |
| 6,044,355 A | 3/2000 | Crockett et al. | |
| 6,205,412 B1 | 3/2001 | Barskiy et al. | |
| 6,263,065 B1 | 7/2001 | Durinovic-Johri et al. | |
| 6,353,667 B1 | 3/2002 | Foster et al. | |
| 6,404,747 B1 | 6/2002 | Berry et al. | |

(Continued)

OTHER PUBLICATIONS

Office Action dated Jul. 10, 2009 for U.S. Appl. No. 11/464,097; 30 pages.

(Continued)

*Primary Examiner* — Brian J Gillis
*Assistant Examiner* — Austin Moreau
(74) *Attorney, Agent, or Firm* — Lisa Ulrich; Roberts Mlotkowski Safran & Cole, P.C.

(57) ABSTRACT

A method and system for measuring performance and balancing workload of sites, virtual clusters and servers within the virtual clusters is provided. A monitor measures and computes performance metrics at each level. Servers are individually measured for performance and based on average response time of servers that are members of a virtual cluster, a virtual cluster performance metric may also be computed. Further, the performance of a site may be profiled based on the virtual cluster metrics and/or server performance metrics. Based at least in part on these performance metrics, a domain oriented request may be resolved and routed based in part on the performance metrics at each level virtual cluster and server. In this manner, a request may be directed to a destination server to achieve higher performance and efficiencies for the requesting client while at the same time balancing workload among possible servers available to service the request.

21 Claims, 13 Drawing Sheets

(56) References Cited

U.S. PATENT DOCUMENTS

| | | |
|---|---|---|
| 6,442,583 B1 | 8/2002 | Eilert et al. |
| 6,480,600 B1 | 11/2002 | Neyman et al. |
| 6,728,748 B1 * | 4/2004 | Mangipudi et al. ............ 718/105 |
| 6,760,775 B1 * | 7/2004 | Anerousis et al. ............ 709/238 |
| 6,922,724 B1 * | 7/2005 | Freeman et al. .............. 709/223 |
| 6,970,829 B1 | 11/2005 | Leamon |
| 7,020,619 B2 | 3/2006 | Thompson |
| 7,023,979 B1 | 4/2006 | Wu et al. |
| 7,086,061 B1 | 8/2006 | Joshi et al. |
| 7,103,562 B2 | 9/2006 | Kosiba et al. |
| 7,155,723 B2 | 12/2006 | Swildens et al. |
| 7,181,524 B1 | 2/2007 | Lele |
| 7,254,626 B1 * | 8/2007 | Kommula et al. ............ 709/223 |
| 7,349,969 B2 * | 3/2008 | Gourlay et al. ................ 709/227 |
| 7,467,225 B2 * | 12/2008 | Anerousis et al. ............ 709/238 |
| 7,478,051 B2 | 1/2009 | Nourbakhsh et al. |
| 7,593,904 B1 | 9/2009 | Kirshenbaum et al. |
| 8,019,636 B2 | 9/2011 | Ricketts |
| 8,539,075 B2 | 9/2013 | Bali et al. |
| 2001/0032120 A1 | 10/2001 | Stuart et al. |
| 2002/0062454 A1 | 5/2002 | Fung |
| 2002/0138443 A1 | 9/2002 | Schran et al. |
| 2002/0143597 A1 | 10/2002 | Andre et al. |
| 2002/0143599 A1 | 10/2002 | Nourbakhsh et al. |
| 2002/0147632 A1 | 10/2002 | Winham et al. |
| 2002/0175929 A1 | 11/2002 | Hunt et al. |
| 2002/0184069 A1 | 12/2002 | Kosiba et al. |
| 2003/0065548 A1 | 4/2003 | Schmidt |
| 2003/0088672 A1 | 5/2003 | Togasaki |
| 2003/0177182 A1 | 9/2003 | Clark et al. |
| 2003/0188208 A1 | 10/2003 | Fung |
| 2003/0196126 A1 | 10/2003 | Fung |
| 2003/0200473 A1 | 10/2003 | Fung |
| 2004/0103194 A1 | 5/2004 | Islam et al. |
| 2004/0122950 A1 | 6/2004 | Morgan et al. |
| 2004/0240635 A1 | 12/2004 | Bushey et al. |
| 2004/0266533 A1 | 12/2004 | Gentles et al. |
| 2005/0010682 A1 * | 1/2005 | Amir et al. .................... 709/238 |
| 2005/0033858 A1 | 2/2005 | Swildens et al. |
| 2005/0065831 A1 | 3/2005 | Keay et al. |
| 2005/0120095 A1 | 6/2005 | Aman et al. |
| 2006/0074700 A1 | 4/2006 | Ricketts |
| 2006/0136479 A1 | 6/2006 | Fan et al. |
| 2007/0250631 A1 | 10/2007 | Bali et al. |
| 2008/0112557 A1 | 5/2008 | Ricketts |
| 2014/0006614 A1 | 1/2014 | Bali et al. |

OTHER PUBLICATIONS

Office Action dated Jan. 22, 2010 for U.S. Appl. No. 11/464,097; 46 pages.
Office Action dated Jul. 22, 2010 for U.S. Appl. No. 11/464,097; 33 pages.
Notice of Allowance dated May 8, 2013 for U.S. Appl. No. 11/464,097; 15 pages.
Notice of Allowance dated Mar. 10, 2014 for U.S. Appl. No. 14/017,622; 11 pages.
Notice of Allowance dated Mar. 23, 2011 for U.S. Appl. No. 10/951,827; 5 pages.
Final Office Action dated Apr. 16, 2010 for U.S. Appl. No. 10/951,827; 18 pages.
Office Action dated Sep. 17, 2009 for U.S. Appl. No. 10/951,827; 17 pages.
Final Office Action dated May 18, 2009 for U.S. Appl. No. 10/951,827; 12 pages.
Office Action dated Sep. 30, 2008 for U.S. Appl. No. 10/951,827; 14 pages.
Final Office Action dated Jun. 13, 2012 for U.S. Appl. No. 11/559,519; 17 pages.
Office Action dated Dec. 23, 2011 for U.S. Appl. No. 11/559,519; 17 pages.
Final Office Action dated Apr. 6, 2011 for U.S. Appl. No. 11/559,519; 15 pages.
Final Office Action dated Oct. 27, 2010 for U.S. Appl. No. 11/559,519; 14 pages.
Mehrotra et al., "Call Center Simulation Modeling: Methods, Challenges, and Opportunities", Simulation Conference, Winter 2003, pp. 135-143; As cited and considered in U.S. Appl. No. 10/951,827.
Klungle, Robert, "Simulation of Claims Call Center: A Success and a Failure", Simulation Conference, Winter 1999, pp. 1648-1653; As cited and considered in U.S. Appl. No. 10/951,827.

* cited by examiner

ON-DEMAND GLOBAL SERVER LOAD BALANCING SYSTEM AND METHOD OF USE

FIELD OF THE INVENTION

The invention generally relates a system and method of monitoring servers in a network and, more particularly, to a system and method for intelligently routing requests from a client to a server based on performance metrics at several layers of the network.

BACKGROUND DESCRIPTION

In network operations, balancing server loads is an ongoing concern with varying solutions employed. The industry overall has attempted to address global server load balancing (GSLB) issues and typically includes one or more of the following solutions:

Active-Standby

This solution is a more traditional disaster recovery approach where deployment uses two data centers; one is active and a second remains idle operating in standby mode. When the active faults, the second becomes the active data center.

Active-Active

This deployment alternative is typically more cost-effective and more resilient to interruptions. This solution usually has at least two data centers that are actively serving data so that if one center is disrupted, the other data center continues processing on behalf of the other, perhaps with degraded service.

Proximity

This solution is a variation of the active-active GSLB deployment which is configured to route the client to the "closest" data center to achieve better exploiter experience and to save or avoid over-usage of expensive wide-area bandwidth. This deployment alternative is attractive for applications that involve the transfer of large volumes of data, require a global presence or relies on real-time interaction with remote users.

In a network system, it is difficult to load balance millions of query activities over a number of servers in an open cluster environment when queries may vary from very simple to resolve to being complex and rather timely to resolve, for example, queries to a lightweight directory access protocol (LDAP) server or to web application servers. For example, using a light weight directory protocol (LDAP) scenario as an example, since no two exploiters requests typically consume equal amounts of LDAP resources, determining optimal load balancing for these varying requests at a server level becomes an issue. Too many longer running queries hitting one LDAP server or site may impact the whole site throughput and, in turn, negatively impact other exploiting applications also directed to that site. Therefore, if queries can be intelligently directed to an LDAP site known to be able to process a request based on current performance criteria then response times may be optimized while minimizing the probability of overloading a particular LDAP site.

Further, once a request arrives at a site, then selecting a server from among multiple servers at the LDAP site may also be relevant for optimizing overall throughput to the site and for a client's continual overall experience. Currently, there is no capability to sense when a server, for example, an LDAP server or web application server, is heavily burdened either absolutely or in relation to other servers. This may lead to further overloading of the overburdened server, which creates inefficiencies within the system. Thus, temporary or even permanent reallocation of new queries to other servers in a cluster or shifting of server assignments is a desirable capability to improve overall query throughput and lessening of bottlenecks in network operations.

SUMMARY OF THE INVENTION

In an aspect of the invention, a method of processing queries in a network is provided. The method comprises the steps of measuring performance of one or more servers, computing a performance metric for each of the one or more servers and routing a request to one of the one or more servers based on the computed performance metric to balance the workload among the one or more servers.

In another aspect of the invention, a method of routing requests in a network is provided. The method comprises the steps of computing a performance metric for at least any one of a site, a virtual cluster, and a server of a plurality of servers and routing a request to at least any one of the site, the virtual cluster and the server based on the performance metric for balancing workload among the plurality of servers, wherein the performance metric includes a response time metric associated with the at least any one of a site, a virtual cluster, and a server of a plurality of servers.

In another aspect of the invention, a system for routing requests in a network is provided. The system comprises at least one component to measure performance of one or more servers in one or more virtual clusters, generate a performance metric for each of the one or more servers and route a request to one of the one or more servers based on the computed performance metric to balance the workload among the one or more servers.

In another aspect of the invention, a system for balancing workload is provided. The system comprises means for collecting performance measurements for at least any one of a server, a virtual cluster and a site, means for generating at least a server performance metric, a virtual cluster metric or a site performance statistic based on the performance measurements, and means for routing a request to a server based on at least any one of the server performance metric, the virtual cluster metric, the site performance statistic and any combination thereof.

In another aspect of the invention, a method for establishing a computing infrastructure is provided. The method comprises the step of combining computer readable code with a computing platform. The method further comprises the steps of computing a performance metric for at least any one of a site, a virtual cluster, and a server of a plurality of servers of the combined computing platform, routing a request to at least any one of the site, the virtual cluster and the server based on the performance metric for balancing workload among the plurality of servers, wherein the performance metric includes a response time metric associated with the at least any one of a site, a virtual cluster and a server of the plurality of servers.

In another aspect of the invention, a computer program product comprising a computer usable medium having readable program code embodied in the medium is provided. The computer program product includes at least one component to compute a performance metric for at least any one of a site, a virtual cluster and a server of a plurality of servers. The computer program product also includes at least one component to route a request to at least any one of the site, the virtual cluster and the server based on the performance metric for balancing workload among the plurality of servers wherein the performance metric includes a response time metric associated with the at least any one of a site, a virtual cluster, and a server of a plurality of servers.

DETAILED DESCRIPTION OF EMBODIMENTS OF THE INVENTION

This invention, in embodiments, is directed to a system and method for monitoring performance of network sites that process requests for services (e.g., lightweight directory access protocol (LDAP) servers, web application servers, database servers, or the like) and determining which sites among a plurality of sites should receive a client request based on balancing metrics. Further, the system and method may also provide for selecting a server from among one or more servers at the selected site based on performance weighting metrics.

By monitoring individual sites and servers within sites, performance statistics (e.g., memory utilization, CPU utilization, response time, connection counts, and the like) may be established in order to trigger re-direction of requests to under-utilized or better performing servers or sites. This redirection increases the efficiency of the system.

Figure 1A:
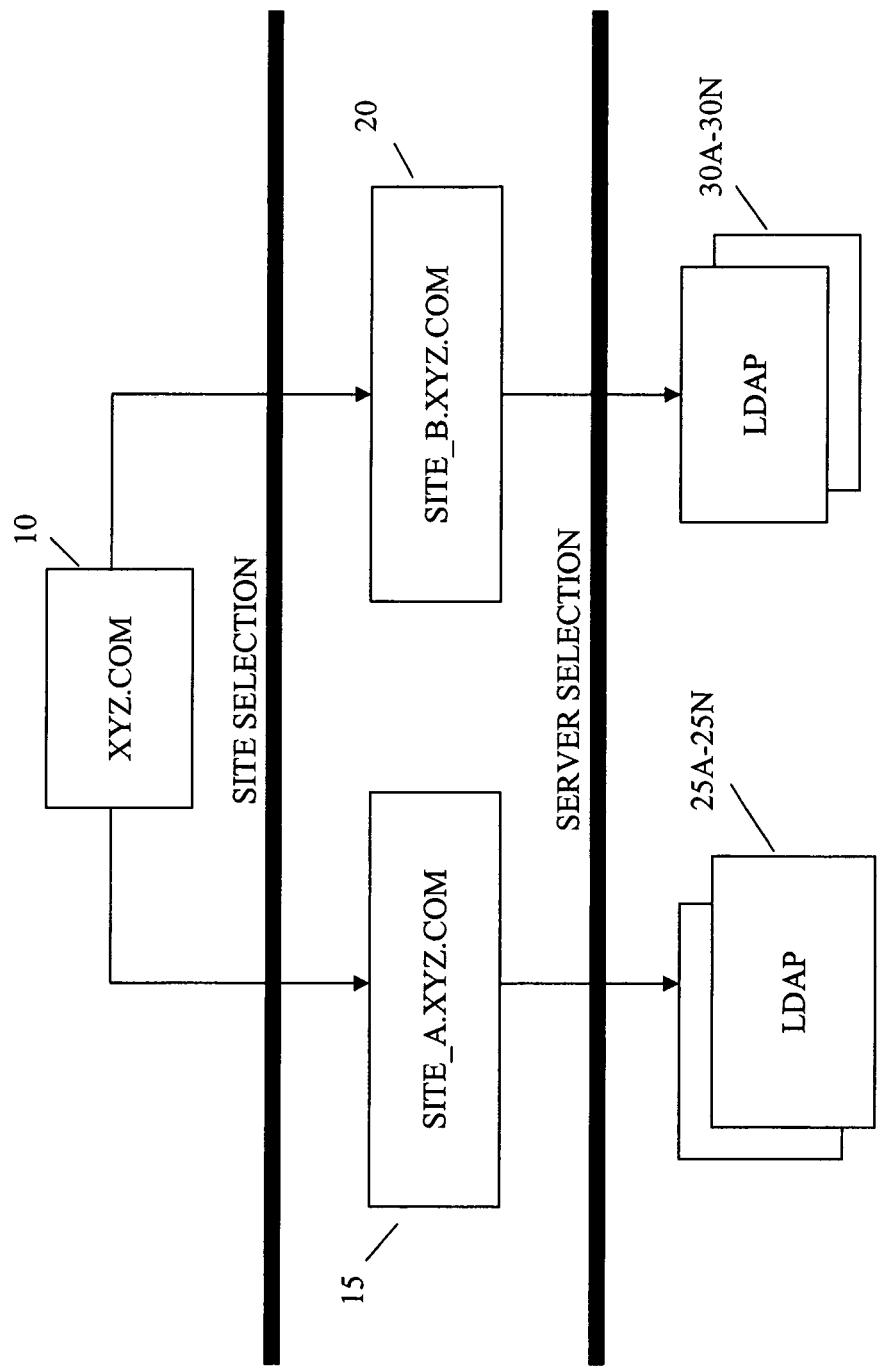
FIG. 1A is a block diagram of an embodiment illustrating multi-layer load balancing aspects of the invention.

FIG. 1A is a block diagram of an embodiment illustrating multi-layer load balancing aspects of the invention. The illustration shows that a domain name, for example, "xyz.com", as denoted by reference numeral 10, may have several sites associated with it. In this example, two associated sites are shown as "site-a.xyz.com" and "site-b.xyz.com," and designated as reference numerals 15 and 20, respectively. Of course, any number of sites may exist for a domain(s), as one of ordinary skill should recognize. The system and method of the invention also addresses routing and balancing requests between these sites 15, 20 in an efficient manner based on performance metrics gathered from the individual sites 15, 20. The performance metrics may also factor into account the distance one site is versus another so that inadvertent slowness is avoided if a request were to be routed to a site too distant for efficient response time. Also shown in FIG. 1A are one or more servers 25A-25N associated with site 15 and one or more servers 30A-30N associated with site 20. The system and method also addresses efficient routing of requests to the most appropriate server within a site, also based on gathered metrics from the servers or server clusters. These routing and performance metrics aspects are described more fully below.

Figure 1B:
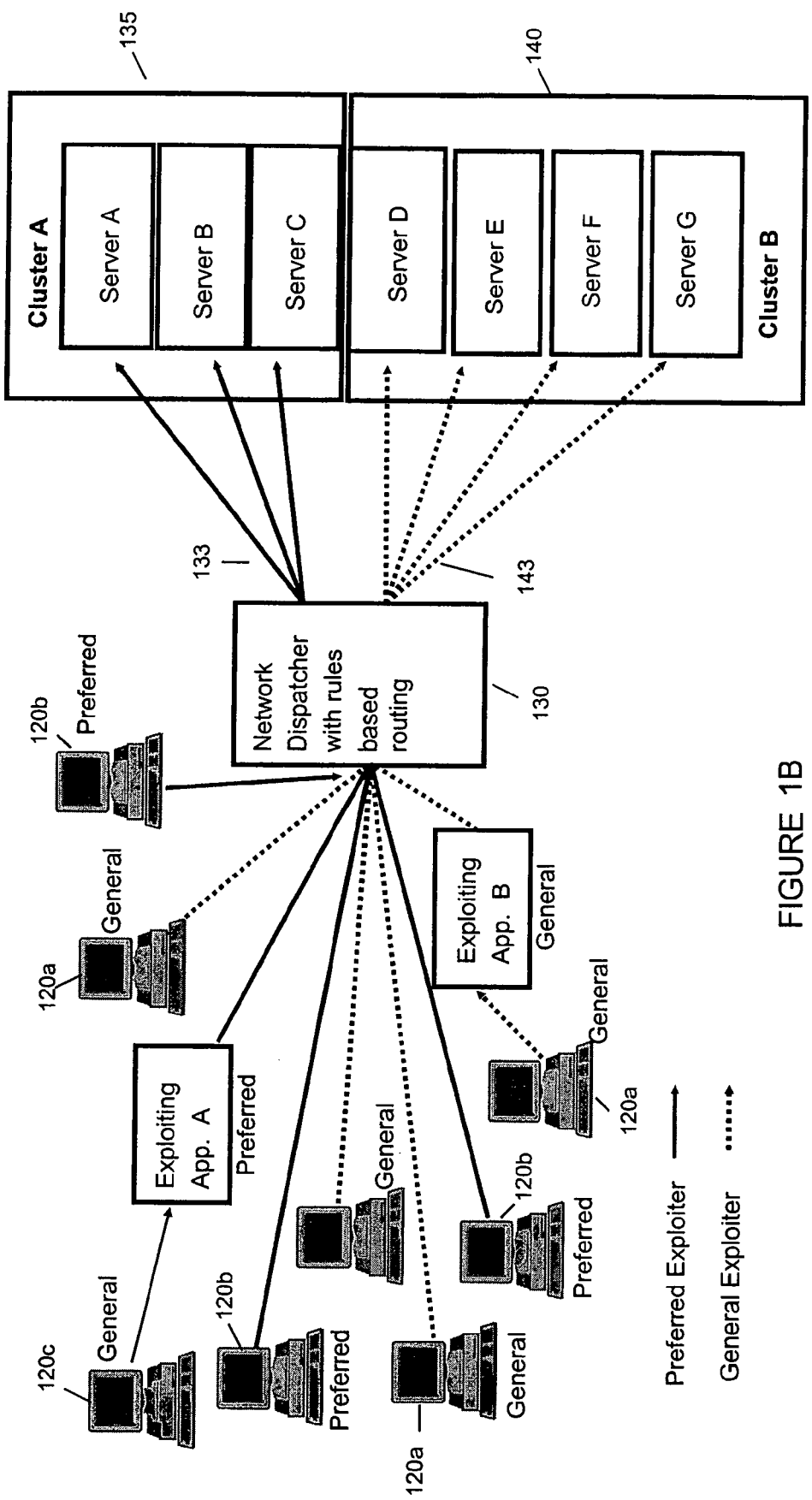
FIG. 1B is a functional block diagram of an embodiment of the invention.

FIG. 1B is a functional block diagram of an embodiment of the invention. Applications 120a, 120b, and 120c (which may be client applications, system applications, or the like) are in communication, typically by way of a network, with an intelligent network dispatcher 130. The intelligent dispatcher (ND) 130 provides static rules based routing, or alternatively, intelligent routing of service requests from the applications 120a-120c. Examples of the network dispatcher and virtual clustering operations are described in more detail by U.S. patent application Ser. No. 10/758,538, incorporated by reference herein, in its entirety.

In FIG. 1B, servers A-G (which may be, for example, servers 25A-25N or 30A-30N) may be logically grouped by administration of the ND 130 into one or more virtual clusters such as 135 and 140. In this illustrative example, servers A-C may be assigned to virtual cluster A, 135, and servers D-G assigned to another virtual cluster B, 140. Although two virtual clusters are shown in FIG. 1B, it should be apparent to one of ordinary skill in the art that any number of virtual clusters may exist depending upon circumstances.

The ND 130 may receive requests (e.g., LDAP lookup requests) from applications 120a-120c (associated with clients, users or customers) and, based on rules configured within the ND 130 and performance metrics that may be available from individual servers, intelligently routes the request from a requester to an appropriate server. These rules can be pre-programmed into the network dispatcher in known ways by those of ordinary skill in the art of such rules based programming. The performance metrics are gathered over time and made available on the servers for the network dispatcher's use by an enterprise directory monitor (ED MON) described below.

For example, the virtual cluster A, 135, may service requests from a preferred exploiters or customers (known, for example, by their Internet Protocol (IP) addresses, other Internet address, or other network identifier). In this case, these requests may be authenticated and directed, as represented by reference numeral 133, by the ND 130 to one of the servers in virtual cluster A, 135, on a service priority basis. In contrast, non-preferred/general customers may be routed to virtual cluster B, 140, as indicated by reference numeral 143, on a less urgent basis. Further, the system and method of the invention may also provide routing to one cluster or another based upon performance metrics so that a better performing cluster, or otherwise less burdened cluster, receives a pro-rated amount of requests according to performance criteria.

Figure 2A:
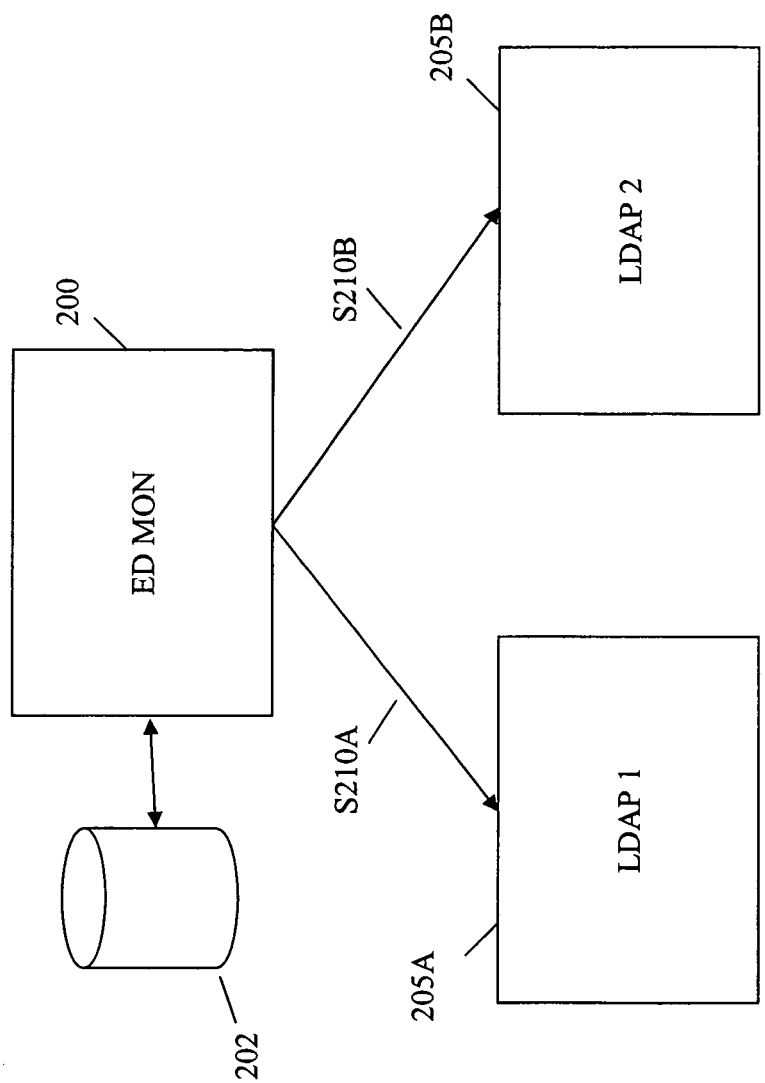
FIG. 2A is a functional block diagram of an embodiment of the invention illustratively showing collection of balancing metrics.

FIG. 2A is a functional block diagram of an embodiment of the invention illustratively showing collection of balancing metrics. Included it this embodiment is an enterprise monitor (ED MON) 200 having a database 202 in communication with one or more servers 205A and 205B, in this example, LDAP servers. Also shown are steps of ascertaining performance metrics which are denoted as steps S210A and S210B.

The ED MON 200 monitors the performance of each of the LDAP servers 205A and 205B (equivalent to servers 25A-25N or 30A-30N, but with added ability to interact with the ED MON) to ascertain relative performance statistics. The monitoring includes sending a random search to each server replica (i.e., 205A, 205B) and receiving a reply to the random search as denoted by steps S210A and S210B, respectively. Each random search may be a trivial request that randomly accesses a record in each server 205A, 205B. The random search to each server is typically constructed so that the information being requested has a low likelihood of being currently maintained in cache memory at the servers. Otherwise, if the information being requested is in cache, the statistical relevance is reduced since requests serviceable from cache are usually processed much faster.

The response time may be measured from each server 205A and 205B and maintained as a response time metric over a period of time, e.g., a sliding window of time, for example, over a five minute period. In this way, the response time may be used for comparative performance between two or more servers. This may be measured as a response time for each. For example, server 205A may have a response time of 25 ms, while the response time for server 205B may be 35 ms. In embodiments, measurements may be taken repeatedly (e.g., once a minute) over the sliding window period and the resulting average response time may be used as a relative comparison of performance between the two or more servers.

Figure 2B:
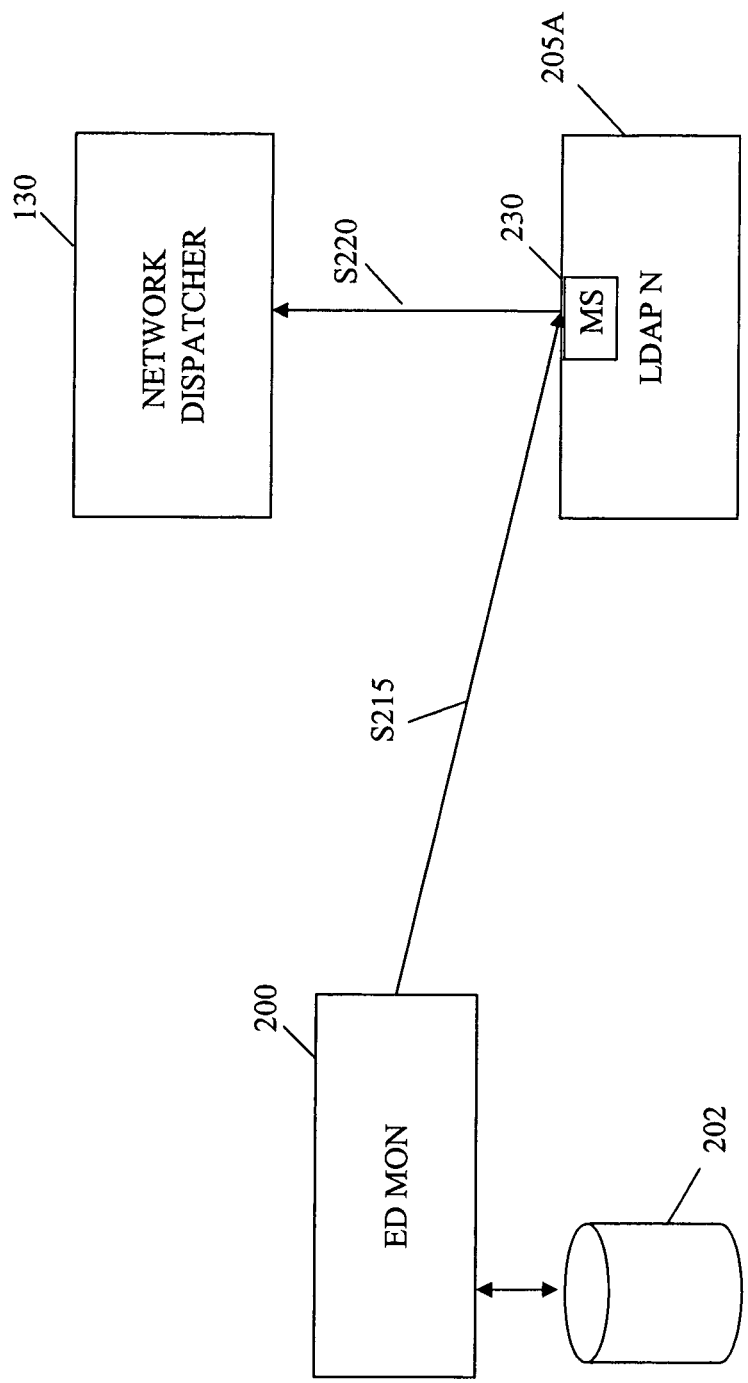
FIG. 2B is a functional block diagram of an embodiment of the invention showing handling of metrics.

FIG. 2B is a functional block diagram of an embodiment of the invention showing handling of metrics. FIG. 2B also shows steps denoted as steps S215 and S220. The ED MON 200, having measured and generated metrics as described in relation to FIG. 2A, regularly deposits calculated metric data (e.g., response times or other performance data) on each individual measured server 205, which is shown as step S215. An area (e.g., memory or file) on each server, known as a metric store (MS) 230, maintains the deposited metric data.

Periodically, at step S220, the network dispatcher 130 reads the metric data stored in the metric store 230 to acquire the performance data for use as a basis for routing requests to the servers 205. Servers with better performances typically receive higher percentages of the requests. In this way, optimal performance may be achieved by balancing the servers processing based on ongoing metric computation. That is, as processing demands for applications peak and ebb, server workload allocations may automatically be adjusted to achieve optimum throughput for clients.

Figure 2C:
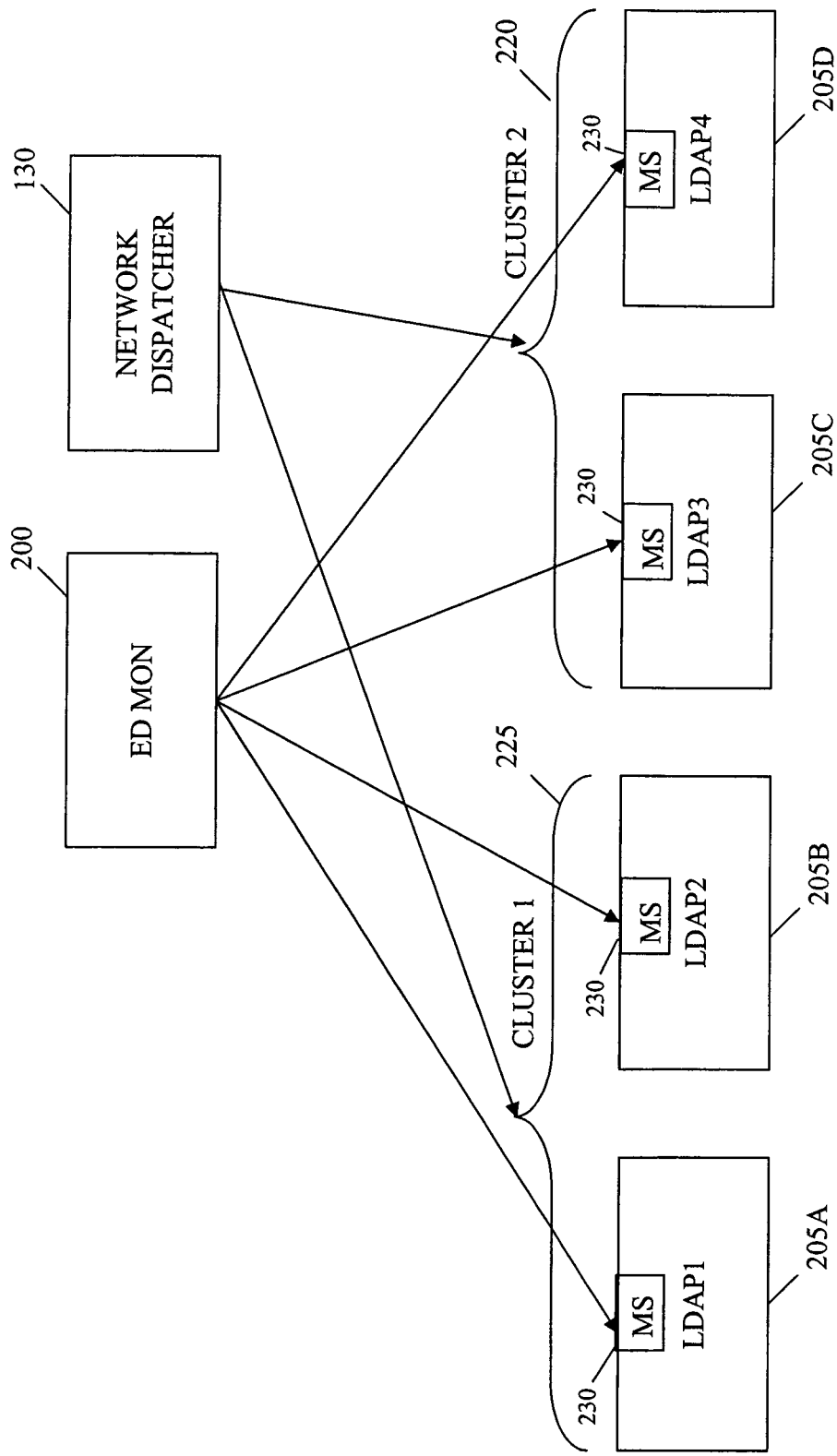
FIG. 2C is a functional block diagram of an embodiment of the invention showing server selection with virtual clusters using balancing metrics.

FIG. 2C is a functional block diagram of an embodiment of the invention showing server selection with virtual clusters using balancing metrics. Virtual clusters may be configured and dynamically re-configured according to demands on applications provided by servers in a cluster. Examples of virtual clusters and dynamic virtual cluster reconfiguration techniques may be found in U.S. patent application Ser. No. 10/758,538. One or more virtual clusters each with one or more servers or, one or more servers without clusters may be associated with a site such as, for example, site-a 15 and site-b 20 (FIG. 1A).

Referring to FIG. 2C, servers 205A through 205D are arranged into two virtual clusters 220 and 225. Cluster-1, 225, includes servers 205A and 205B while cluster-2, 220, includes servers 205C and 205D. In embodiments, there may be any number of clusters and each cluster may have any number of servers, as needed. The ED MON 200 may monitor the performance of each server 205A-205B as discussed previously and also obtains virtual configuration data of each server from each server or, alternatively, in embodiments, via communications with the network dispatcher 130. In this manner, the ED MON 200 recognizes the virtual cluster membership and configuration of each server, which may be a part of the metric store (MS) 230 of each server. A server may be a member of more than one virtual cluster.

As performance metrics are gathered and computed for each server by the ED MON 200, the ED MON 200 also computes the overall virtual cluster metrics for each virtual cluster 225, 220 encountered. This virtual cluster metrics is typically an accumulation of statistics over a sliding window period for server members of each virtual cluster and may include an average response time or other resource utilization statistics (e.g., computational usage, memory usage, etc.) for the virtual server overall. The ED MON 200 may update these statistics on each server 205A-205D as the statistics are computed, for example, by storing the data in the metric store area for each virtual cluster definition. In this manner, each virtual cluster's performance may be maintained and made available to the network dispatcher 130 for basing routing decisions so that virtual clusters may receive load balancing considerations similar to load balancing considerations for individual servers.

Moreover, as definitions of virtual clusters dynamically change (i.e., as servers are added or removed from a cluster due to demand considerations), the ED MON 200 may also adjust its metric computations for the redefined virtual cluster accordingly. Alternatively, when a virtual cluster definition changes (e.g., new server members added to a cluster), the virtual cluster statistics may be reset (e.g., nulled or zeroed) in order to re-create a new and accurate baselining of statistics over the next sliding window period for the new virtual cluster definition(s). The network dispatcher 130 may read the virtual cluster statistics from the metric store 230 periodically or on demand (e.g., when virtual cluster definitions or server assignments change). In this way, the network dispatcher 130 has current performance data on individual servers as well as overall performance data on associated virtual clusters 220, 225.

Figure 2D:
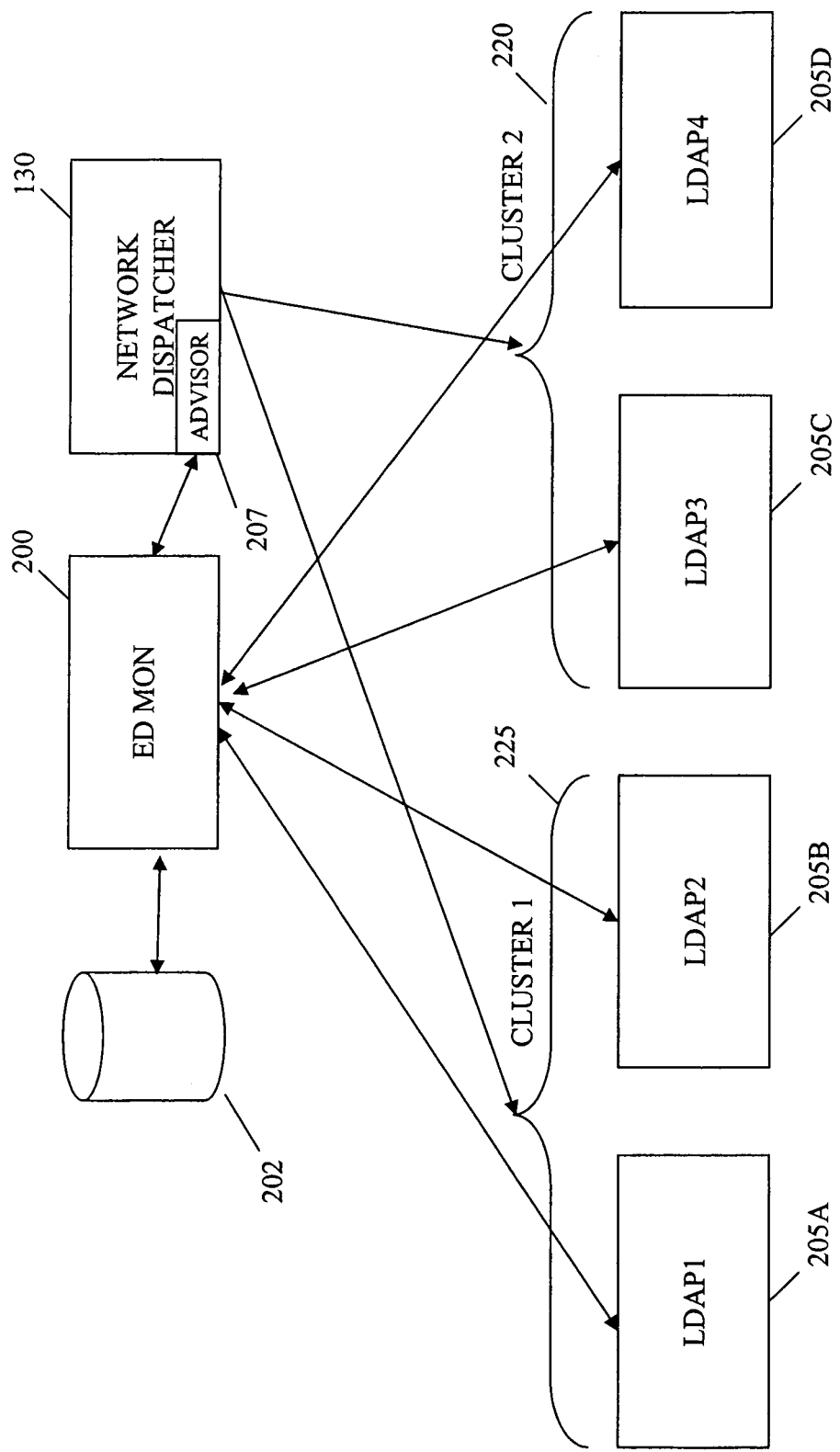
FIG. 2D is a functional block diagram of an embodiment of the invention showing server selection using balancing metrics.

FIG. 2D is a functional block diagram of an embodiment of the invention showing server selection using balancing metrics. The ED MON 200 gathers statistics from the servers 205 over time and stores these statistics in database 202. The statistics include load performance info on each server and may include virtual cluster statistics, as appropriate. The network dispatcher 130 has a component known as an advisor 207 that acquires statistical information from the database 202. In this manner, real-time statistical information may be maintained by the ED MON 200 and pulled by the advisor 207 and made available to the network dispatcher 130 for use in routing decisions to the servers or virtual clusters. The network dispatcher may then compute relative weighting of each server (or cluster) to equally distribute load.

Figure 3A:
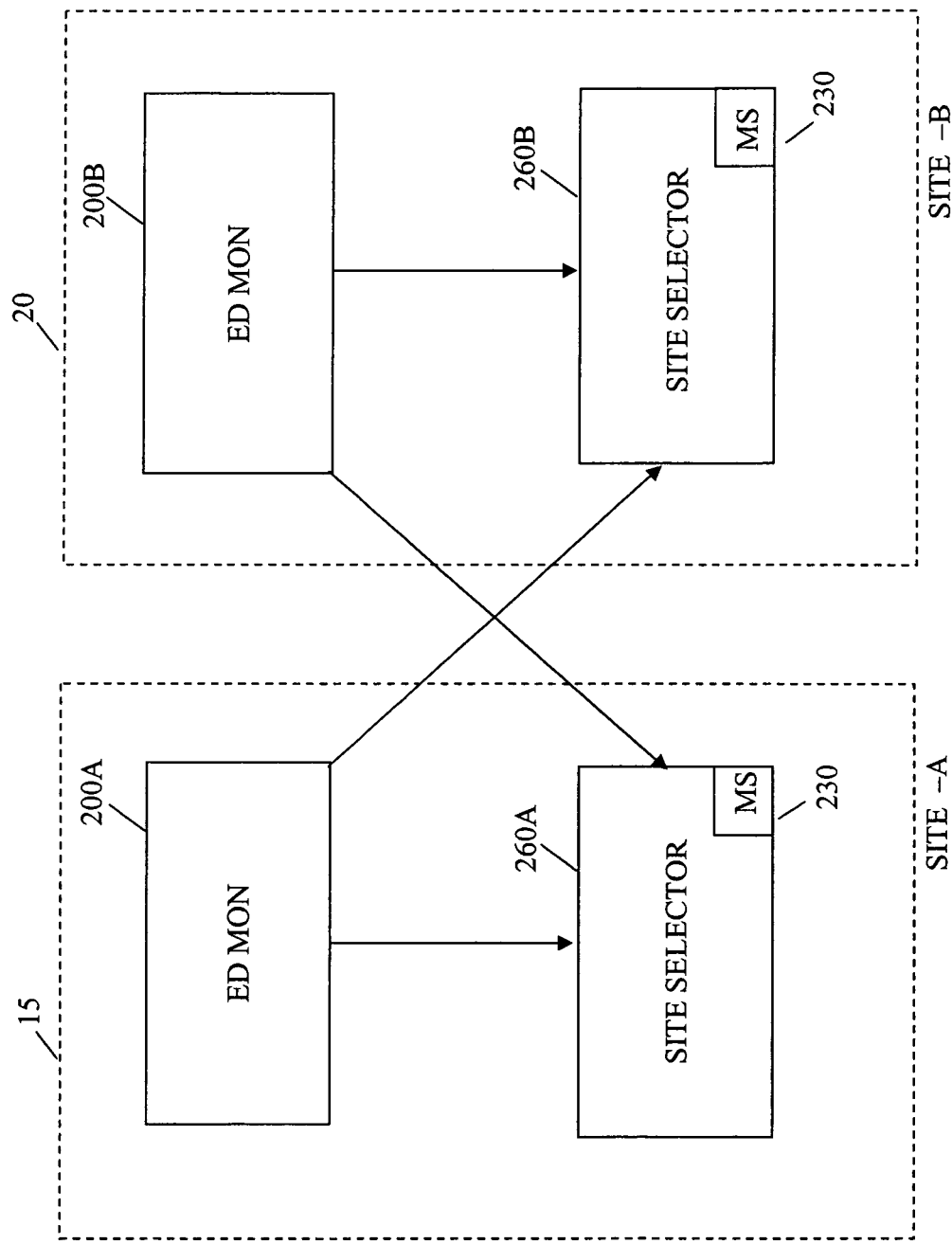
FIG. 3A is a functional block diagram of an embodiment of the invention illustratively showing aspects of site level balancing.

FIG. 3A is a block diagram of an embodiment of the invention illustratively showing aspects of site level balancing. In addition to any virtual clusters and servers, site-a 15 and site-b 20 may each have an associated ED MON 200A and 200B, respectively. Further, each site 15, 20 may also have a site selector 260A and 260B, respectively. In this illustrative example, each ED MON 200 communicates with both site selectors 260A and 260B. The ED MON 200 monitors the server and virtual cluster operations associated with a site (e.g., as described in reference to FIG. 2C) and as performance metrics for servers and/or virtual clusters become available, site performance metrics may also be computed by the associated ED MON 200. For example, average response times for a site (averaged response for all virtual servers and/or servers associated with the site), perhaps on a sliding window basis also, may be accumulated and comparatively used to determine site routing decisions.

The site statistics may also be used to compute site weights indicative of performance throughput. These weights or performance metrics (e.g., average site response time) may cause re-direction of requests, perhaps as a percentage of requests, to alternate sites according to the comparative performance of one site versus another site. In this way, an overloaded site or a less efficient site may receive a lower percentage of requests while a more efficient site might receive a higher percentage of requests. As time passes, these percentages may automatically adjust as conditions and performance metrics change.

Further, distance factors may be taken into account for basing routing decisions so that inordinately long distances are avoided which may cause unintentional delays simply due to latency or propagation issues. There may be many sites associated with one domain that are monitored for metrics and comparative routing decisions.

Figure 3B:
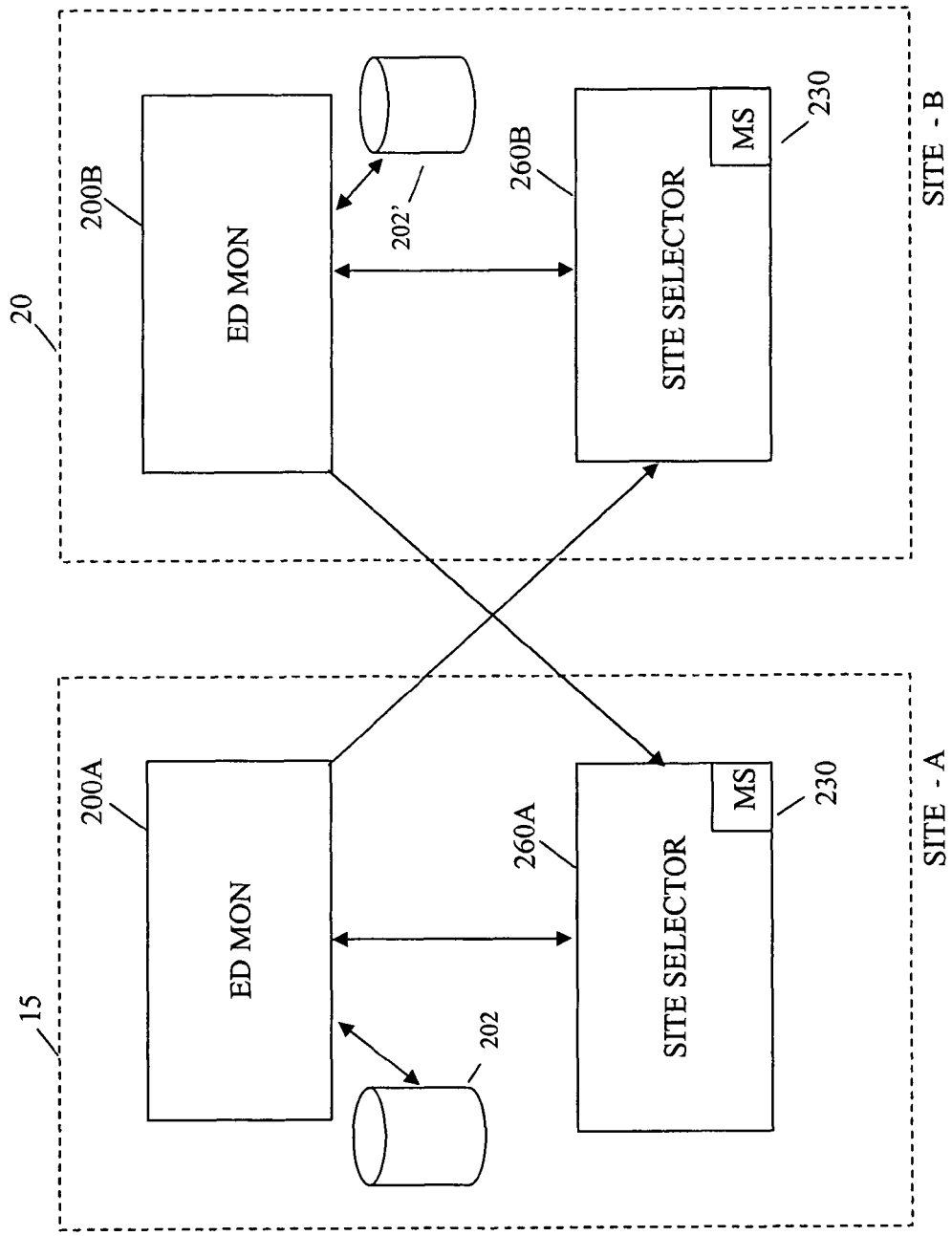
FIG. 3B is a functional block diagram of an embodiment of the invention illustratively showing aspects of site level balancing.

FIG. 3B is a block diagram of an embodiment of the invention illustratively showing aspects of site level balancing. This embodiment is similar to the embodiment of FIG. 3A, except that the ED MON 200A, 200B maintains statistical performance information on the sites in a database 202, 202'.

Figure 4A:
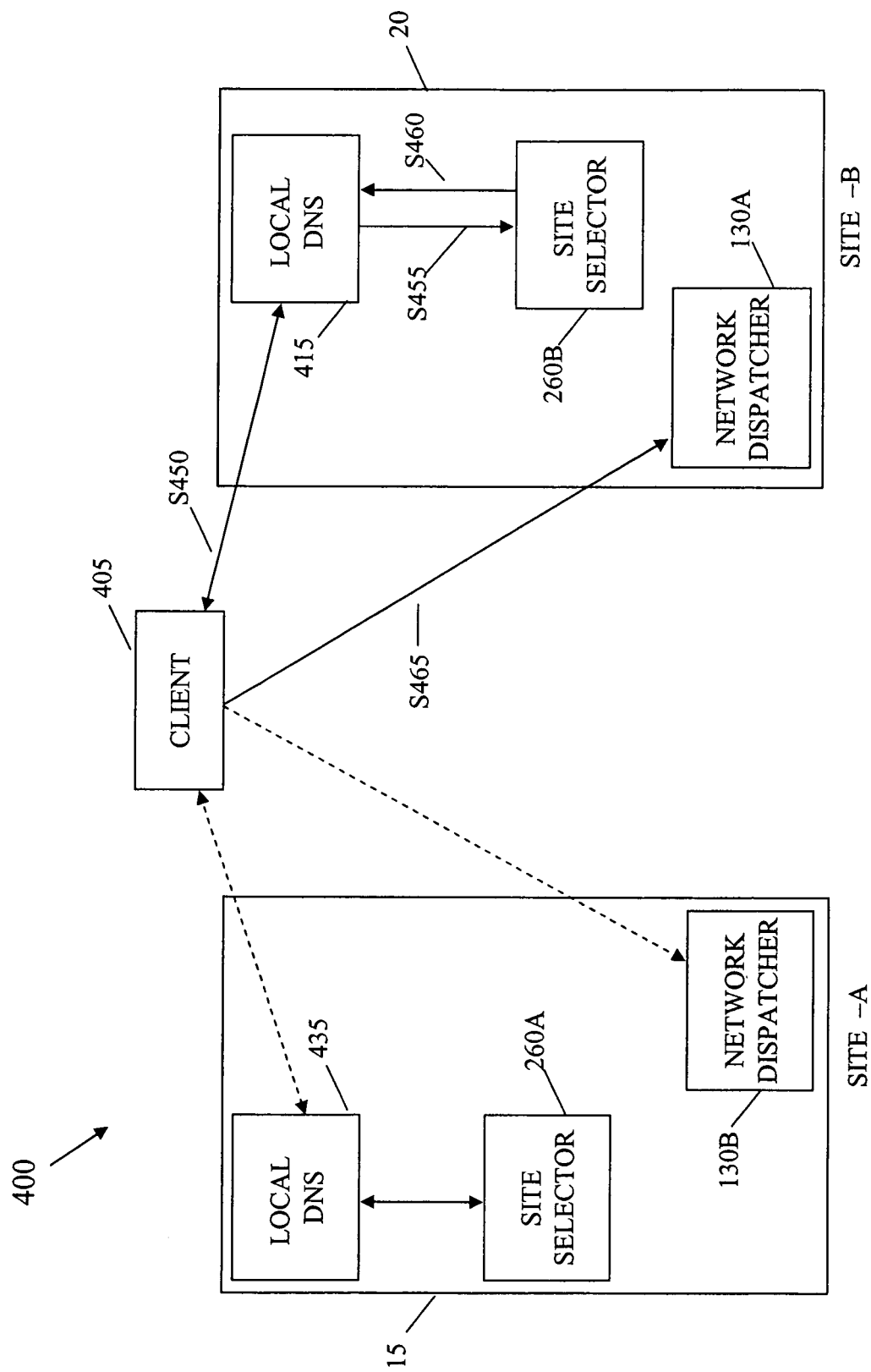
FIG. 4A is a functional block diagram of an embodiment of the invention illustrating user routing and site selection.

FIG. 4A is a functional block diagram of an embodiment of the invention illustrating user routing and site selection, generally denoted by reference numeral 400. FIG. 4 also shows certain steps associated with using the invention shown as steps S450-S465. Site-a 15 is shown having an associated local domain name server (DNS) 435, a site selector 260A and a network dispatcher 130B. Similarly, site-b 20 is shown having an associated local DNS 415, a site selector 260B, and a network dispatcher 130A.

When a client 405 issues a request, perhaps, for example, a "bluepages" request, at step S450, the request is routed to the nearest DNS (which is typically known in client cache) which in this example is DNS 415. The DNS 415 determines that the request resolves to site selector 420 due to a pre-established delegation record. A delegation record is a commonly known concept that one of ordinary skill in the DNS art should recognize. At step S455, the site selector 260B is accessed and at step S460, the site selector 260B responds by returning an Internet Protocol (IP) address to the client 405 (typically via the DNS) of the fastest and/or closest cluster and/or server for processing the request.

At step S465, the client contacts the IP addressed returned, which in this example is the address of ND 130A. It should be recognized that another network dispatcher may have been indicated for contact such as ND 130B, depending on dynamic performance metrics used by the site selector for determining which ND may process the request. A subsequent request may indeed result in the subsequent request being routed to another ND, based on rules and/or performance metrics.

Figure 4B:
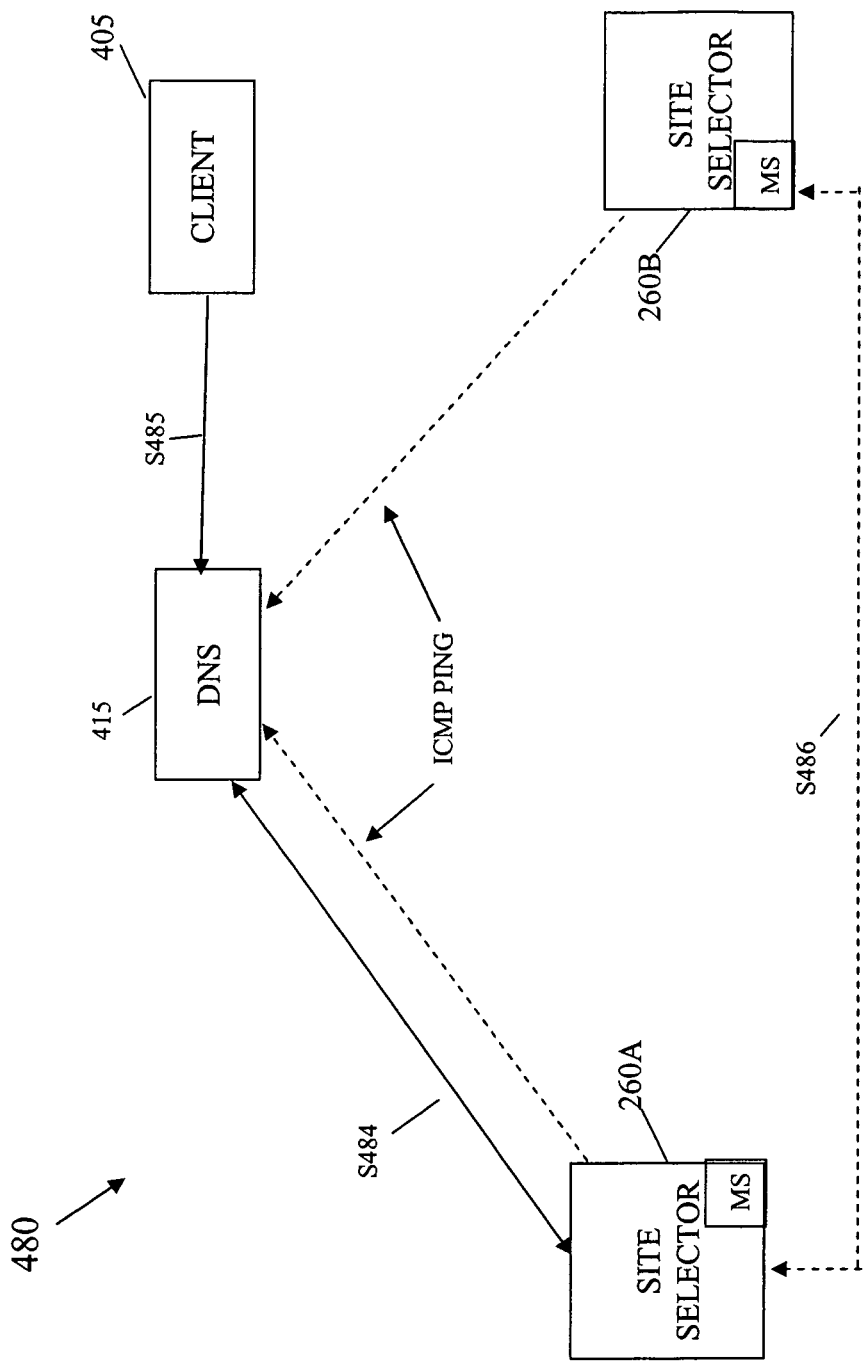
FIG. 4B is a functional block diagram of an embodiment of the invention illustrating user routing and site selection.

FIG. 4B is a functional block diagram of an embodiment of the invention illustrating user routing and site selection, generally denoted by reference numeral 480. In this embodiment, at step S485, a client 405 may request DNS resolution. At step S484, the DNS 415 may request the IP address for a cluster from the site selector 260A. At step S486, the site selector 260A may request metrics from other site selectors (or from servers, as appropriate). The site selectors may each determine their distance (e.g., in milliseconds) from the DNS 415 using an ICMP ping. The site selector 260A may then inform the DNS 415 of the appropriate IP address to use, which is typically the closest.

Figure 5:
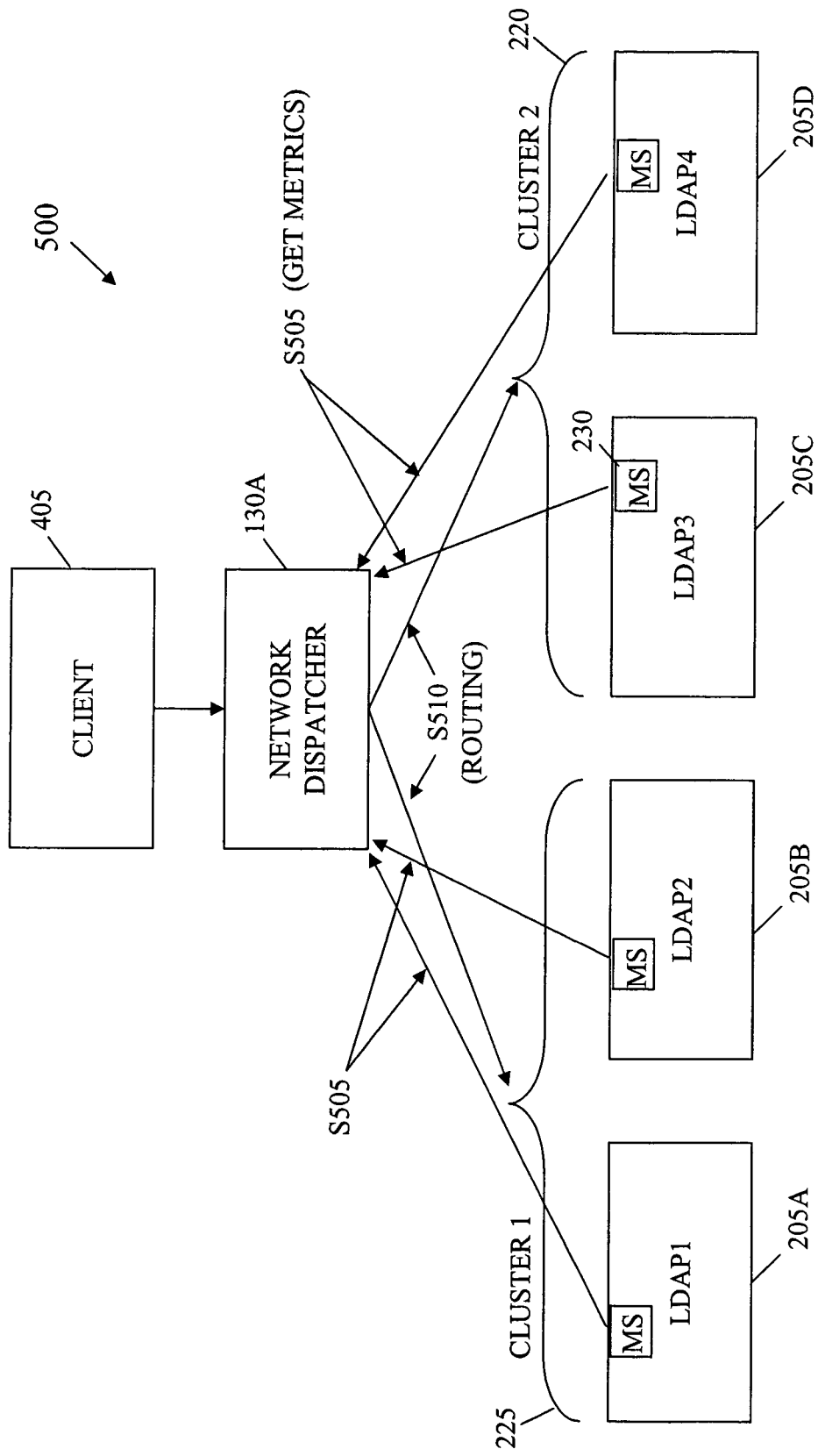
FIG. 5 is a functional block diagram of an embodiment of the invention showing cluster selection and server selection.

FIG. 5 is a functional block diagram of an embodiment of the invention showing cluster selection and server selection, generally denoted by reference numeral 500. Continuing with the example from FIG. 4, once a client receives an IP address from a DNS (e.g., DNS 415) which may have been provided by a site selector (e.g., 260B) for processing the request, the client sends the request to the supplied IP address, which in this example, is the IP address for ND 130A.

At step S505, the ND 130A receives cluster and server performance metric data from each the servers 205A-205D, which normally occurs asynchronously (but not limited to asynchronous) to any requests from any client. At step S510, based on the performance metrics obtained from the metric store in each server and routing rules that are active for the ND 130A, the ND 130A determines which cluster 225 or 220 should receive the request. Additionally, based on server metrics, the ND 130A also determines which server within the selected virtual cluster is to receive the request. The request is then forwarded to the selected server within the selected virtual cluster for processing.

The system and method therefore provides a multi-layered selection process for routing requests from clients which include site selection, virtual cluster selection and server selection within a cluster. In embodiments, one or more layer selections may be optional. For example, sites selections may not be relevant for a particular situation, however, virtual cluster selection and server selection may be appropriate. Alternatively, virtual cluster selection may not be appropriate (perhaps due to configurations) while site selection based on metrics may be appropriate.

USING THE INVENTION

Figure 6:
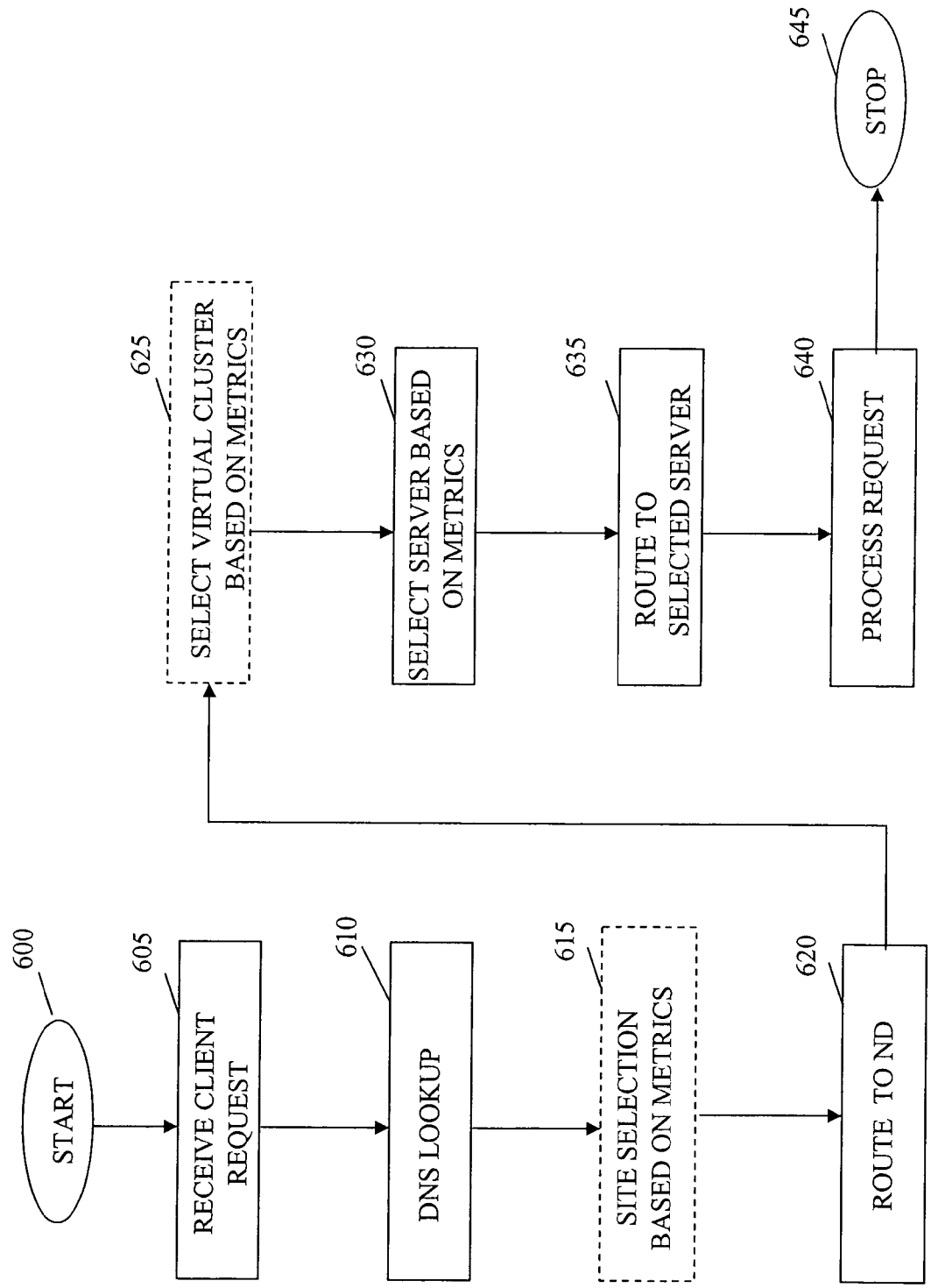
FIG. 6 is a flow diagram of an embodiment showing steps of using the invention.

FIG. 6 is a flow diagram of an embodiment showing steps of using the invention, beginning at 600. FIG. 6 (and all other Figures showing steps) may equally represent a high-level block diagram of components of the invention implementing the steps thereof. The steps of FIG. 6 (and all other Figures showing steps) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The computer readable code may be combined with the appropriate hardware and/or computing platform (which may be distributed software and hardware components, either new or pre-existing) for executing certain steps of the invention. Components (e.g., servers, or the like) of the computing platform may be interconnected via a network. Further, the software and hardware may be configured, perhaps as part of a service, for establishing the interoperability of the software and hardware components. The configuring may include such activity as initializing data structures and identifying components to one another (e.g., addresses), for example, to comply with the topology of a particular environment.

Continuing with the flow of FIG. 6, at step 605, a request is received from a client such as, for example, a web site or domain address. At step 610, the request is routed to a DNS, typically the closest or assigned, for lookup and resolution. At optional step 615, the DNS may recognize that the request is eligible for site selection processing and defers resolution to an associated site selector. A site may be selected based on site performance metrics that may include a distance weighting factor. Otherwise, if no site selector is applicable, the DNS resolves the request to a ND. At step 620, the request is resolved and routed to the ND.

At optional step 625, the ND may select one virtual cluster over another based on routing rules and/or performance metrics associated with the virtual cluster(s). The performance metrics typically include an averaging of one or more server's performance metrics within the virtual cluster(s) creating a virtual cluster performance rating. At step 630, the ND may select one server based on metrics and may also include assuring that a percentage of traffic routed overall to the servers within a virtual cluster (if appropriate) is proportionate to weighted performance of the individual servers. In this way a more efficient performing server may receive more traffic on average.

At step 635, ND routes the request to the selected server for processing. At step 640, the request may be processed by the selected server and any reply returned to the requesting client in typical fashion. At step 645, the process ends.

Figure 7:
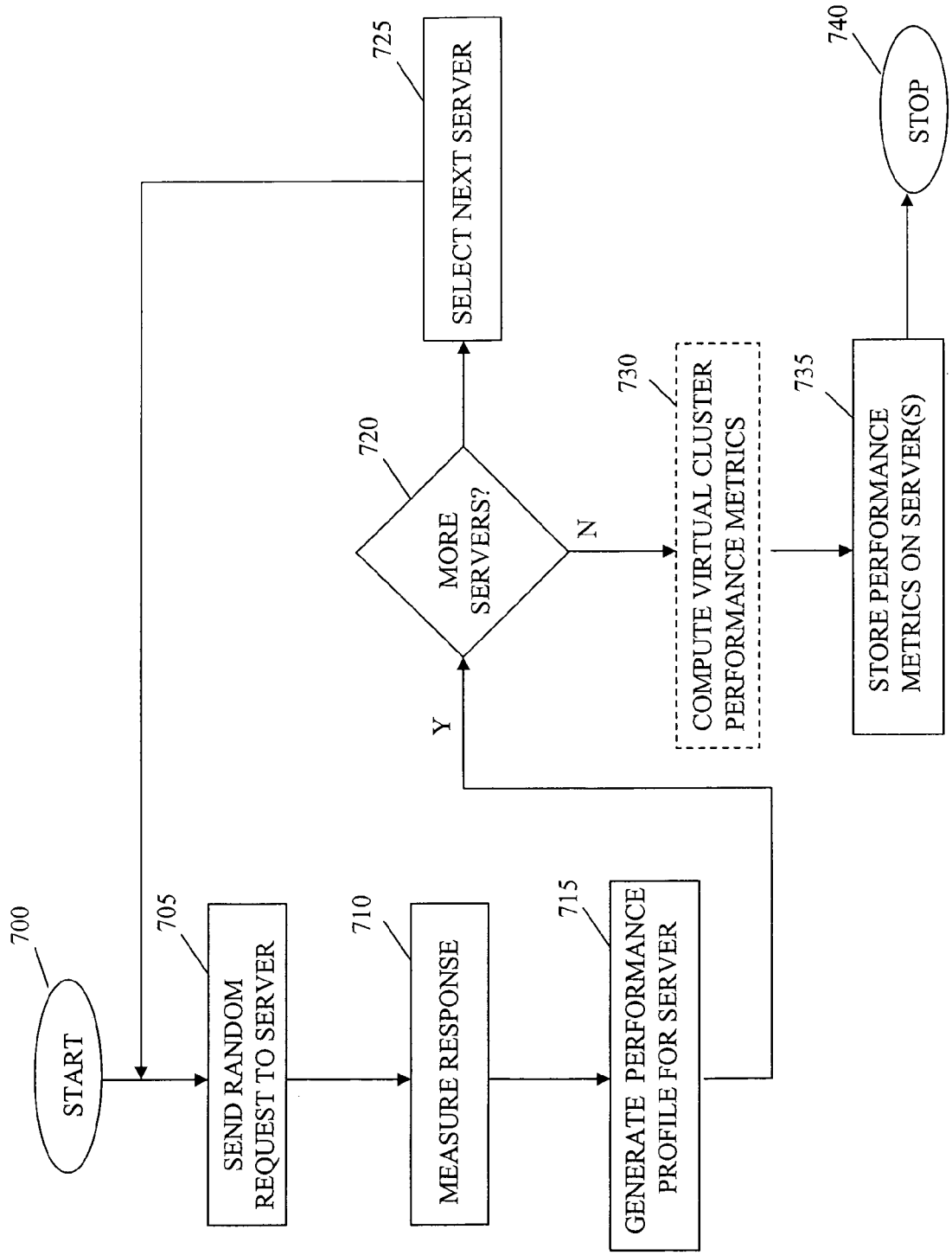
FIG. 7 is a flow diagram of an embodiment showing steps of using the invention.

FIG. 7 is a flow diagram of an embodiment of using the invention, starting at step 700. At step 705, a random request is sent to a server which may be a member of one or more virtual clusters. The random request is typically sufficiently random to assure that the request will not be processed from cache at the server. At step 710, the response time is measured and accumulated over a sliding window period. At step 715, a performance profile may be generated/updated for the server.

At step 720, a check is made if any more servers are remaining to be measured. If so, then at step 725, a next server is selected and processing continues at step 705 where another random request may be sent to the next server. If, however, there are no more servers remaining to be measured, then at optional step 730, performance metrics for one or more virtual clusters that the measured servers may be a member is calculated. At step 735, the performance metrics (i.e., server and/or virtual cluster metrics) may be stored on each server for subsequent use by a network dispatcher. At step 740, the process ends. The process may recommence at step 700 at predetermined or configured intervals.

While the invention has been described in terms of embodiments, those skilled in the art will recognize that the invention can be practiced with modifications and in the spirit and scope of the appended claims.

What is claimed is:

1. A method of processing queries in a network, comprising determining, by a computing device, virtual cluster membership information of a plurality of servers in the network, the virtual cluster membership information identifying each of the plurality of servers as a member in a respective one of a plurality of virtual server clusters, wherein the virtual server clusters are dynamically determined, logical groupings of the plurality of servers;
    measuring, by the computing device, respective performance information of the plurality of servers;
    computing, by the computing device, respective performance metrics corresponding to the plurality of servers;
    computing, by the computing device, respective virtual cluster performance metrics corresponding to the plurality of virtual clusters based on the respective virtual cluster membership information and the respective performance metrics of the plurality of servers belonging to the plurality of virtual clusters, wherein the respective virtual cluster performance metrics include average response times over a predetermined period of time of the plurality of servers identified as members in each of the plurality of virtual server clusters;
    resetting the virtual cluster performance metrics as definitions of respective virtual clusters in the virtual cluster membership information are dynamically changed;
    routing a request to one of the plurality of servers based on the computed performance metric to balance a workload among the one or more servers;
    routing the request to one of a plurality of site selectors associated with one of a plurality of sites, which includes assuring that a percentage of traffic routed overall to the selected server within a virtual cluster is proportionate to a weighted performance of the individual servers; and
    determining, by the computing device, performance metrics of the one of the plurality of sites by requesting performance metrics from site selectors.

2. The method of claim 1, further comprising the step of storing the performance metric on the one or more servers.

3. The method of claim 1, wherein the performance metric is a response time metric and stored on the one or more servers.

4. The method of claim 1, wherein the routing a request step comprises basing the routing on a distance factor.

5. The method of claim 1, further comprising the steps of:
    routing the request to a site selector for selecting a site from a plurality of sites;
    selecting the site for processing the request based on site performance metrics; and
    routing the request to an address associated with the site for processing.

6. The method of claim 5, wherein the address is an address of a network dispatcher.

7. The method of claim 1, wherein the routing step comprises:
    selecting one virtual cluster from the one or more virtual clusters based on the virtual cluster performance metric; and
    routing the request to the one of the one or more servers that is a member of the selected one virtual cluster.

8. The method of claim 7, wherein the virtual cluster performance metric is an indication of performance of the selected one virtual cluster based on an average of response times of member servers of the selected one virtual cluster.

9. The method of claim 1, further comprising:
    monitoring one or more sites for performance;
    computing site performance metrics for the one or more sites; and
    storing the site performance metrics on at least one site selector for basing the routing.

10. The method of claim 1, wherein the measuring performance step comprises sending a random request to each of the one or more servers and measuring the amount of time to reply.

11. A method of routing requests in a network, comprising:
    computing, by a computer device, respective performance metrics for one of a plurality of sites, a first virtual server cluster of a plurality of virtual server clusters, and a first server of a plurality of servers, wherein the virtual server clusters are dynamically determined, logical groupings of the plurality of servers;
    obtaining, by the computer device, virtual cluster membership information identifying the first server as a member of the first virtual server cluster;
    routing, by the computer device, a request to the site, the first virtual cluster and the first server based on the virtual cluster membership information and the respective performance metrics for balancing workload among the plurality of servers, wherein the respective performance metrics include a response time metric associated with each of the site, the virtual cluster, and the server of the plurality of servers, wherein the routing the request includes assuring that a percentage of traffic routed overall to the selected server within a virtual cluster is proportionate to a weighted performance of the individual servers;

routing the request to one of a plurality of site selectors associated with the one of the plurality of sites; and determining, by the computing device, performance metrics of the one of the plurality of sites by requesting performance metrics from at least one of the plurality of site selectors.

12. A system for routing requests in a network, comprising:

a computing platform comprised of hardware and one or more computer readable memory storage devices;

computer readable program code stored on the one or more computer readable memory storage devices for execution by the computing platform, the program code comprising:

program code that measures performance of one or more servers in a plurality of virtual clusters;

program code that generates a server performance metric corresponding to each of the one or more servers;

program code that determines virtual cluster membership information corresponding of the one or more servers, the virtual cluster membership information identifying the one or more servers as a member in a respective one of the plurality of virtual server clusters, wherein the virtual server clusters are dynamically determined, logical groupings of the plurality of servers;

program code that computes a virtual cluster performance metric corresponding to each one of the plurality of virtual clusters based on the virtual cluster membership information and the server performance metric for each of the one or more servers belonging to the plurality of virtual clusters, wherein the virtual cluster performance metric includes an average of response times over a predetermined period of time of the one or more servers identified as members in each of the plurality of virtual server clusters;

program code that routes a request to one of the one or more servers based on the virtual cluster performance metric and the server performance metric to balance a workload among the one or more servers;

program code that routes the request to one of a plurality of site selectors associated with one of a plurality of sites; and program code that determines site performance metrics of the one of the plurality of sites by requesting performance metrics from at least one of the site selectors, wherein the virtual cluster performance metrics are reset as the definitions of respective virtual clusters in the virtual cluster membership information are dynamically changed and the routing the request includes assuring that a percentage of traffic routed overall to the selected server within a virtual cluster is proportionate to a weighted performance of the individual servers.

13. The system of claim 12, further comprising program code that stores the server performance metric on the one or more servers.

14. The system of claim 12, wherein the server performance metric is at least any one of a response time metric, a processing metric, a memory metric, a connection count metric, which is stored on the one or more servers.

15. The system of claim 12, wherein the program code that routes performs the routing based on a distance factor.

16. The system of claim 12, further comprising:

program code that routes the request to a site selector for selecting a site from a plurality of sites;

program code that selects the site for processing the request based on site performance metrics; and program code that routes the request to an address associated with the site for processing.

17. A computer program product comprising a computer readable storage device having computer readable program code stored on the computer readable storage device, the computer program code comprising:

program code that computes respective virtual cluster performance metrics for each of a plurality of sites, a first virtual cluster of a plurality of virtual clusters, and a first server of a plurality of servers, wherein the virtual server clusters are dynamically determined, logical groupings of the plurality of servers;

program code that obtains virtual cluster membership information identifying the first server as a member of the first virtual server cluster;

program code that routes a request to one of the plurality of sites, the first virtual cluster and the first server based on the virtual cluster membership information and the respective performance metrics for balancing workload among the plurality of servers;

program code that routes the request to one of a plurality of site selectors associated with one of a plurality of sites; and program code that determines site performance metrics of the one of the plurality of sites by requesting performance metrics from at least one of the plurality of site selectors, wherein the virtual cluster performance metrics are reset as the definitions of respective virtual clusters in the virtual cluster membership information are dynamically changed, the routing the request includes assuring that a percentage of traffic routed overall to the selected server within a virtual cluster is proportionate to a weighted performance of the individual servers, and the respective site performance metrics include a response time metric associated with each of the site, the virtual cluster, and the server of the plurality of servers.

18. A system for balancing workload, comprising at least one hardware component configured to:

collect server performance data corresponding to a plurality of servers associated with a site, the server performance data including respective utilization statistics of the plurality of servers;

obtain virtual cluster membership information corresponding to the plurality of servers, the virtual cluster membership information identifying each of the plurality of servers as a member of a respective one of a plurality of virtual server clusters associated with the site, wherein the virtual server clusters are dynamically determined, logical groupings of the plurality of servers;

generate, based on the utilization statistics, respective server performance metrics corresponding to the plurality of servers, wherein the virtual server clusters are dynamically determined, logical groupings of the plurality of servers;

generate, based on the virtual cluster membership information and the server performance metrics, respective virtual cluster performance metric corresponding to the plurality of virtual server clusters associated with the site, wherein the virtual cluster performance metrics are reset as the definitions of respective virtual clusters in the virtual cluster membership information are dynamically changed;

select one of the plurality of virtual server clusters to handle a client request based on the generated virtual cluster performance metrics;

select a first server of the plurality of servers that is a member of the selected virtual server cluster to handle the client request based on the generated server performance metrics;

route the client request to the selected first server;

route the request to one of a plurality of site selectors associated with one of a plurality of sites, wherein the routing the request includes assuring that a percentage of traffic routed overall to the selected server within a virtual cluster is proportionate to a weighted performance of the individual servers; and determine site performance metrics of the one of the plurality of sites by requesting site performance metrics from at least one of the plurality of site selectors.

19. The system of claim 18, wherein:

the collecting the server performance data comprises sending a plurality of searches to each one of the plurality of servers and measuring a plurality of response times of each one of the plurality of servers;

the generating the server performance metric comprises determining an average response time of each one of the plurality of servers; and the generating the virtual cluster performance metric comprises determining an average response time of each one of the plurality of virtual server clusters.

20. A method comprising:

receiving, by a computing device, a client request;

routing the request to one of a plurality of site selectors associated with one of a plurality of sites;

determining, by the one of the plurality of site selectors, site performance metrics of the one of the plurality of sites by requesting performance metrics from other site selectors;

selecting, by the one of the plurality of site selectors, a site to handle the client request from the one of the plurality of sites based on the site performance metrics;

routing, by the one of the plurality of site selectors, the client request to a network dispatcher at the selected site, wherein the selected site comprises a plurality of virtual server clusters and each one of the plurality of virtual server clusters comprises a plurality of servers, wherein the virtual server clusters are dynamically determined, logical groupings of the plurality of servers;

determining, by the network dispatcher, server performance metrics of the plurality of servers;

obtaining, by the network dispatcher, virtual cluster membership information corresponding to the plurality of servers, the virtual cluster membership information identifying each of the plurality of servers as a member of a respective one of the plurality of virtual server clusters;

determining, by the network dispatcher, virtual cluster performance metrics of the plurality of virtual server clusters based on the virtual cluster membership information and the server performance metrics of the plurality of servers;

wherein the virtual cluster performance metrics are reset as the definitions of respective virtual clusters in the virtual cluster membership information are dynamically changed;

after the selecting the selected site, selecting, by the network dispatcher, one of the plurality of virtual server clusters for handling the request based on the virtual cluster performance metrics;

after the selecting the selected virtual server cluster, selecting, by the network dispatcher, one of the plurality of servers of the selected virtual server cluster for handling the request based on the server performance metrics; and routing, by the network dispatcher, the request to the selected server;

wherein the routing the request includes assuring that a percentage of traffic routed overall to the selected server within a virtual cluster is proportionate to a weighted performance of the individual servers.

21. The method of claim 20, wherein:

the site performance metrics are based on average site response time and a distance weighting factor;

the virtual cluster performance metrics are based on average cluster response time; and the server performance metrics are based on average server response time and at least one of: a processing metric, a memory metric, and a connection count metric.

* * * * *